United States Patent
Oestreich

(10) Patent No.: US 7,745,965 B2
(45) Date of Patent: Jun. 29, 2010

(54) ELECTRICAL MACHINE HAVING A COOLING JACKET

(75) Inventor: Markus Oestreich, Schlitz (DE)

(73) Assignee: Siemens Aktiengesellschaft, München (DE)

( * ) Notice: Subject to any disclaimer, the term of this patent is extended or adjusted under 35 U.S.C. 154(b) by 205 days.

(21) Appl. No.: 12/096,325

(22) PCT Filed: Oct. 27, 2006

(86) PCT No.: PCT/EP2006/067855

§ 371 (c)(1),
(2), (4) Date: Jun. 5, 2008

(87) PCT Pub. No.: WO2007/065762

PCT Pub. Date: Jun. 14, 2007

(65) Prior Publication Data

US 2008/0303359 A1 Dec. 11, 2008

(30) Foreign Application Priority Data

Dec. 5, 2005 (DE) .................. 10 2005 058 031

(51) Int. Cl.
*H02K 5/20* (2006.01)
(52) U.S. Cl. .................. 310/54; 310/52; 310/64
(58) Field of Classification Search ............... 310/52, 310/54, 64
See application file for complete search history.

(56) References Cited

U.S. PATENT DOCUMENTS

| 2,887,062 | A | | 5/1959 | Cametti |
| 2,913,988 | A | | 11/1959 | White |
| 3,184,624 | A | * | 5/1965 | Solomon ............... 310/54 |
| 3,439,201 | A | * | 4/1969 | Levy et al. ............. 310/52 |
| 3,478,689 | A | | 11/1969 | Ball |
| 5,799,726 | A | * | 9/1998 | Frank ................ 165/156 |
| 5,859,482 | A | * | 1/1999 | Crowell et al. ......... 310/58 |
| 7,009,317 | B2 | * | 3/2006 | Cronin et al. ......... 310/54 |
| 2005/0235672 | A1 | | 10/2005 | Ayers |

FOREIGN PATENT DOCUMENTS

| DE | 24 51 426 B1 | 8/1975 |
| DE | 297 14 614 U1 | 10/1997 |
| DE | 199 50 660 A1 | 10/2000 |
| DE | 697 03 128 T2 | 5/2001 |
| EP | 1 519 468 A2 | 3/2005 |
| WO | WO 02/095901 A1 | 11/2002 |
| WO | WO 2005/008860 A2 | 1/2005 |

* cited by examiner

*Primary Examiner*—Burton Mullins
(74) *Attorney, Agent, or Firm*—Henry M. Feiereisen; Ursula B. Day

(57) ABSTRACT

In order to improve the cooling of an electrical machine, the invention proposes an electrical machine having a stator (4) and a rotor, wherein the stator (4) has a cooling jacket (10) over at least part of the stator (4), wherein the cooling jacket (10) has a motor jacket (3) surrounding the stator (4) and an outer jacket (1), at least sections of which are spaced apart from said motor jacket (3), and a hollow helix (2) is arranged in the section between the motor jacket (3) and the outer jacket (1) and has a predeterminable pitch (12), and wherein the inlet (7) and the outlet (6) of this cooling jacket (10) are located substantially on an axial plane of the electrical machine.

11 Claims, 4 Drawing Sheets

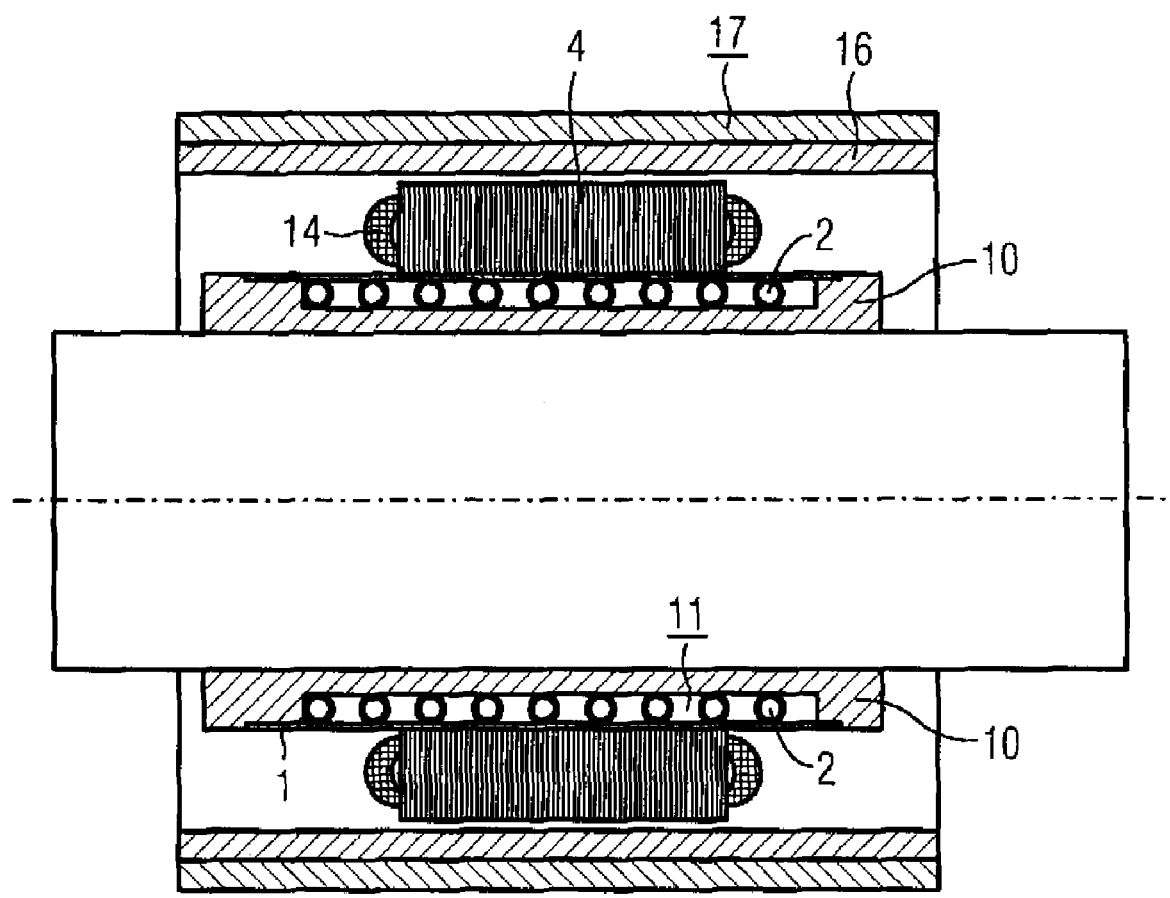

ELECTRICAL MACHINE HAVING A COOLING JACKET

BACKGROUND OF THE INVENTION

The invention relates to an electrical machine with a stator and a rotor, the stator having a cooling jacket over at least an axial part of the stator, the cooling jacket having a motor jacket surrounding the stator and an outer jacket, at least sections of which are spaced apart from said motor jacket.

In order to increase the power and to actively control the temperature of electrical machines, in particular cooling jackets and in this case especially cooling jackets through which liquid is flowing are used. The cooling solutions known to date for electrical machines are based on unidirectional radial or axial throughflows of cooling liquid through a cooling jacket or a cooling pipeline. The cooling liquid in this case draws the lost heat from the electrical machine, as a result of which increased capacity utilization of the electrical machine can be realized, i.e. the useful power which can be emitted by the electrical machine can be comparatively increased.

Cooling jackets are known from the sector of motor-driven pump drives, which cooling jackets have, in addition to a cooling spiral running around the motor, a cooling system arranged between the cooling spiral (U.S. Pat. No. 2,913,988 and U.S. Pat. No. 3,478,689).

SUMMARY OF THE INVENTION

Against this background, the invention is based on the object of providing an electrical machine which has an increase in power in comparison with conventional machines with cooling jackets, in which case the cooling jacket of this electrical machine should be realized in a simple manner, and condensation of the air moisture in the region of the coolant inlet is avoided.

Said object is achieved by an electrical machine with a stator and a rotor, the stator having a cooling jacket over at least an axial part of the stator, the cooling jacket having a motor jacket surrounding the stator and an outer jacket, at least sections of which are spaced apart from said motor jacket, and a hollow helix being arranged in the section between the motor jacket and the outer jacket, which hollow helix has a predeterminable pitch, and wherein the inlet and the outlet of this cooling jacket are located substantially on an axial plane of the electrical machine.

According to the invention, with this cooling jacket the coolant is guided in the counterflow direction in order to make use of as large a heat-emitting area of the electrical machine as possible for heat exchange with the coolant. The heat exchange area is maximized by the counterflow principle. This makes it possible to heat the electrical machines more efficiently and therefore to make greater use of the electrical machine, i.e. in the individual case that the electrical machines can be designed to be shorter and lighter given the same shaft center height or that the useful power of the electrical machine is increased given comparable dimensions.

In principle, the temperatures of the coolant at the inlet and of the coolant at the outlet are very different as a result of the lost heat absorbed from the electrical machine. A formation of cold spots, in particular at the coolant inlet, at which possibly condensation of the air moisture takes place, is avoided in the case of this counterflow principle since the coolant inlet and the coolant outlet are very close to one another. The inlet and the outlet are located substantially on an axial plane of the electrical machine, with the result that the accessibility of the inlet and the outlet for example for maintenance purposes is provided in a simple manner.

As a result of the coolant system of the electrical machine according to the invention, a uniform temperature distribution over the axial length of the electrical machine is achieved and therefore rapid setting of a steady-state thermal operating point is provided.

The counterflow principle according to the invention can be used for cooling but also for heating electrical machines in order to achieve the steady-state thermal operating point as quickly as possible.

Advantageously, in the case of this counterflow principle the coolant flow at the end of the helix flows from this helix into the remaining interspaces between the outer jacket and the motor jacket and therefore results in heat being removed from the electrical machine. Advantageously, the coolant flows through the interspaces opened up by the helix as the intermediate helix back to the outlet. In order to guide the coolant flow in the correct direction, a guiding apparatus is advantageously located at the end of the helix.

The helix is made from a comparatively highly thermally conductive material, in particular from a metallic material such as copper or aluminum, for example.

However, the helix may also comprise a nonmetallic material such as plastic, for example.

The hollow profile of the helix can assume virtually any desired shapes irrespective of the material, such as round, oval, triangular or polygonal cross-sectional profiles, for example. Advantageously, the cross-sectional profiles have surface-enlarging structures, such as ribs, for example.

The helix is adhesively bonded to the motor jacket and/or to the outer jacket. This at the same time results in sealing, with the result that forward flow and in particular return flow of the coolant in predetermined channels is provided.

In a further embodiment, the helix can also be welded to the motor jacket.

In this case, the helix is then especially sealed against the outer jacket by means of suitable materials such as adhesive or a sealing compound in order to form the intermediate helix.

The counterflow principle according to the invention can be used for internal rotor and external rotor motors.

BRIEF DESCRIPTION OF THE DRAWING

The invention and further advantageous configurations of the invention in accordance with the features of the dependent claims are given in the following exemplary embodiments, which are illustrated schematically in the drawings, in which:

FIG. 9 shows an illustration of a cooling jacket in an external rotor motor.

DETAILED DESCRIPTION OF PREFERRED EMBODIMENTS

Figure 1:
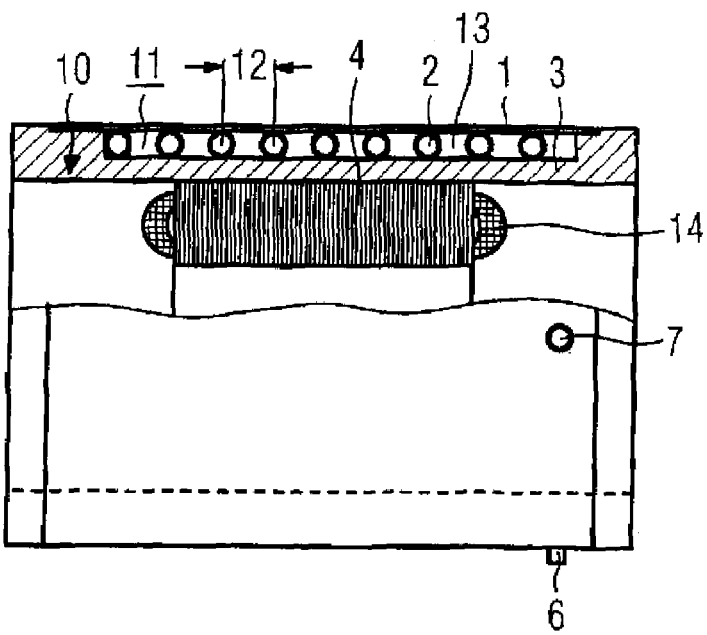
FIG. 1 shows a basic illustration of the cooling jacket with the stator.

FIG. 1 shows a cooling jacket 10, which has an outer jacket 1 and a motor jacket 3 and which has a section 11, in which the cooling jacket 10 and the motor jacket 3 are spaced apart from one another on a predetermined section 11. Arranged in this section 11 is a helix 2, which has a predeterminable pitch 12.

The motor jacket 3 surrounds the stator 4, which has a winding 14, of which there is a basic illustration. A coolant enters at the inlet 7 and emerges at the outlet 6. The losses from the stator 4 and the winding heads provided on the end side of the stator are therefore discharged as well.

Advantageously, the winding head is thermally coupled to the motor jacket 3, for example via a casting compound, with the result that more efficient cooling of the winding heads takes place.

Figure 2:
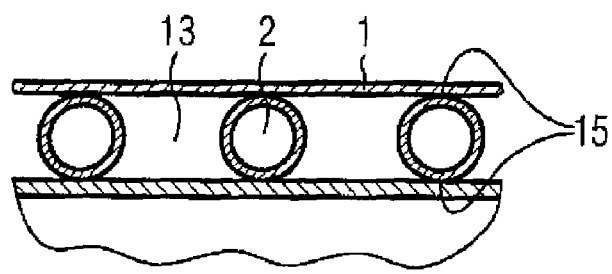
FIGS. 2 to 4 show helix arrangements and shapes.
Figure 3:
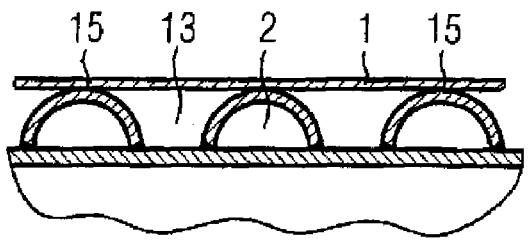
Figure 4:
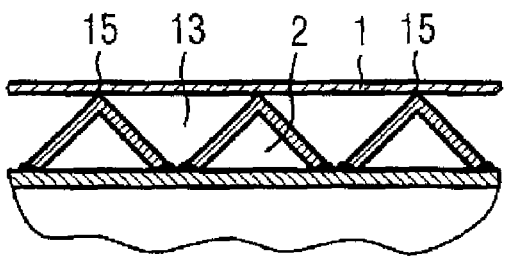

FIGS. 2 to 4 show possibilities for the shape and arrangement of profiles of the helix 2, as they can be arranged on the motor jacket 3.

FIG. 2 shows a basic cross section of a section of a helix 2, the individual turns being welded to the motor jacket 3.

FIG. 3 shows, in a further embodiment, half-shell elements, which are likewise welded or adhesively bonded to the motor jacket 3.

FIG. 4 shows triangular cross-sectional profiles of the helix 2 which are originally open on one side and only form the helix 2 by means of being positioned against the cooling jacket 10.

It is likewise conceivable to form a helix 2 with half-shells, which only form a closed helix 2 by being positioned against the motor jacket 3 or the cooling jacket 10.

The installation is formed, as described above, by means of adhesive bonding or welding.

Figure 5:
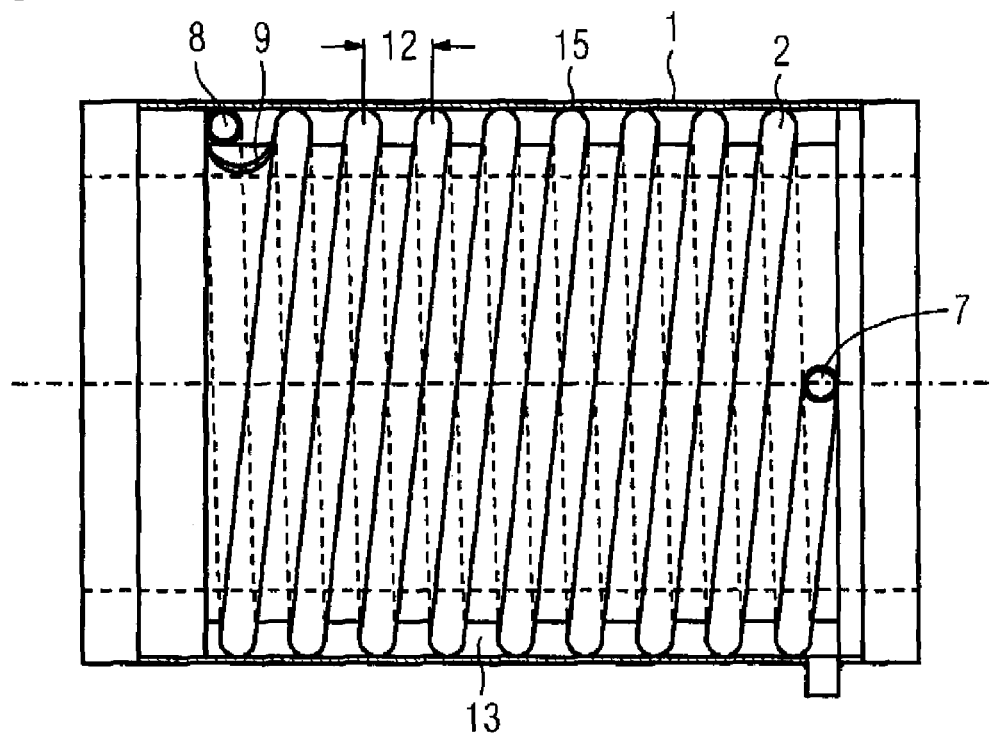
FIG. 5 shows the cooling jacket with the outer jacket cut.

FIG. 5 shows a cooling jacket 10 with a cut outer jacket 1, a deflection of the coolant emerging out of the helix 2 taking place by means of a baffle 9. The coolant flowing via the inlet 7 and through the helix 2 as far as the outlet 6 out of the helix 2 is thus heated and, as it emerges out of the helix 2, is deflected into the interspaces 13 by means of the baffle 9, which interspaces 13 are located between the pitches 12 of the helix 2. Seals 15 between the motor jacket 3, the outer jacket 1 and the helix 2 on the bearing faces which have not been adhesively bonded or welded increase the cooling effect of this counterflow principle according to the invention.

Figure 6:
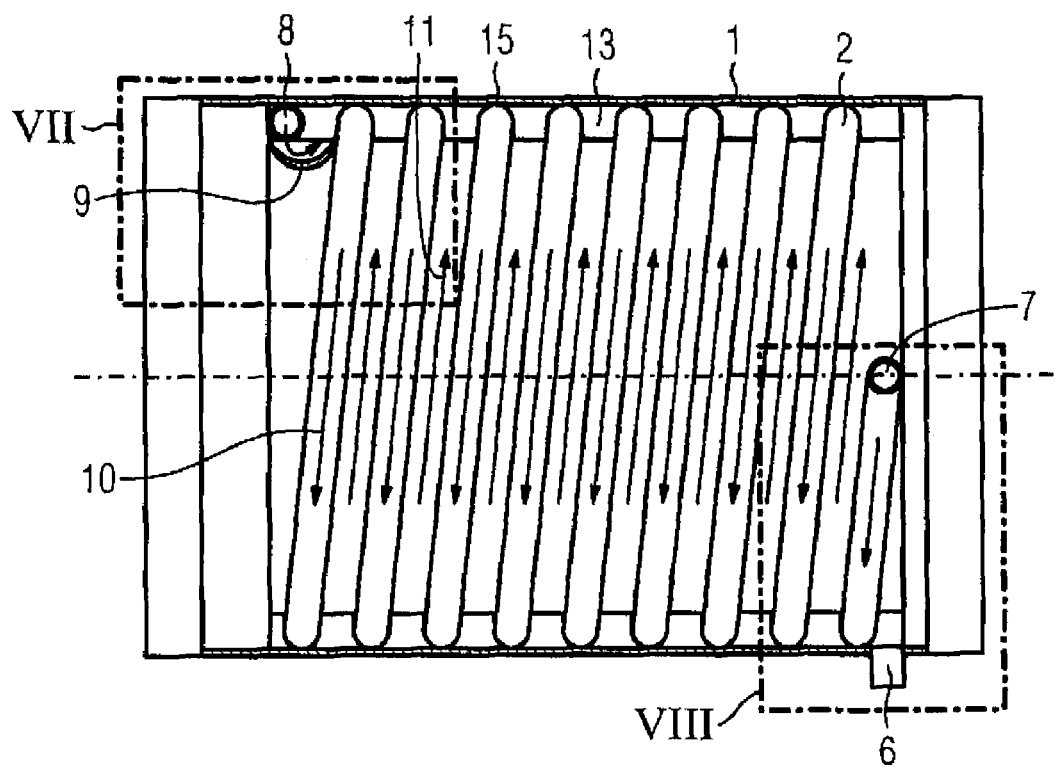
FIG. 6 shows an illustration of the coolant flow with the outer jacket cut open.

FIG. 6 shows, in a further illustration, the coolant flow with the outer jacket 1 cut open.

Figure 7:
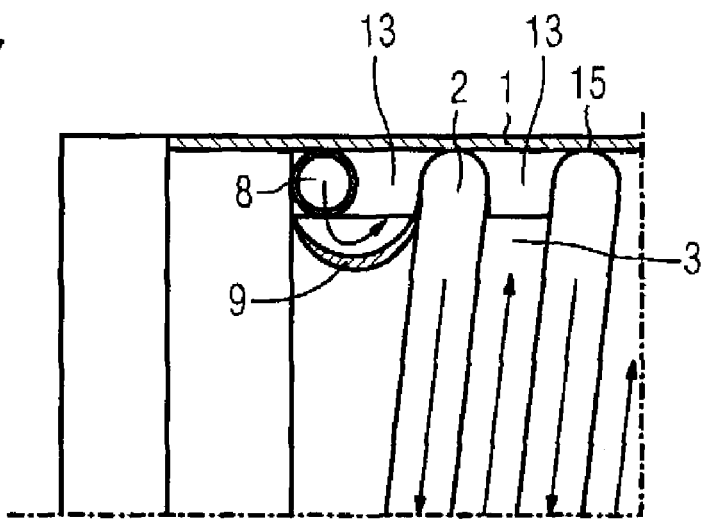
FIGS. 7 and 8 show details from FIG. 6.

FIG. 7 shows, in a more detailed illustration, the outlet 8 from the helix 2 and the deflecting plate 9, with which the coolant flow is deflected in a simple manner into the interspaces 13 located between the helix 2.

Figure 8:
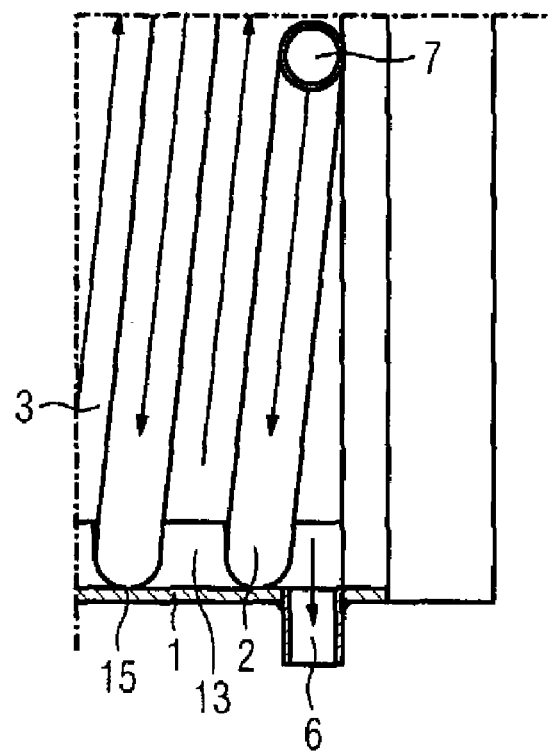

FIG. 8 shows, in a more detailed illustration, the inlet 7 of the coolant into the helix 2 and its outlet 6 out of the interspace 13 located between the helix 2.

The illustration in FIG. 9 shows the principle in accordance with the invention for external rotor motors as well, with a rotor 17, which has permanent magnets 16 facing the air gap.

In a further advantageous embodiment, the pitch 12 of the helix 2 changes over the axial profile of the stator 4. In this case, relatively small turns intervals of the helix 2 are possible in regions with greater sources of heat loss, for example in the region of the winding head.

The gases and liquids known per se are suitable coolants.

What is claimed is:

1. An electrical machine, comprising:
    a stator;
    a cooling jacket which extends over at least part of the stator and has a coolant inlet and a coolant outlet which are located substantially on an axial plane of the electrical machine, said cooling jacket having a motor jacket in surrounding relationship to the stator and an outer jacket having at least one section in spaced-apart relationship to the motor jacket;
    a hollow helix having a predeterminable pitch and arranged in an area of the section between the motor jacket and the outer jacket; and
    a guiding apparatus located at an end of the helix for deflecting a coolant flow in the helix back into an interspace between turns of the helix to the outlet of the cooling jacket.

2. The electrical machine of claim 1, wherein the helix is made of a nonmetallic material.

3. The electrical machine of claim 1, wherein the hollow helix has a profile is configured in virtually any desired shape.

4. The electrical machine of claim 3, wherein the profile of the helix is round, oval, triangular or rectangular.

5. The electrical machine of claim 1, wherein the helix is adhesively bonded to at least one member selected from the group consisting of the motor jacket and the outer jacket.

6. The electrical machine of claim 1, wherein the helix is welded to the motor jacket.

7. The electrical machine of claim 6, further comprising a seal for sealing the helix against the outer jacket.

8. The electrical machine of claim 1, wherein the cooling jacket is constructed for use in an internal rotor machine or an external rotor machine.

9. An electrical machine, comprising:
    a stator;
    a cooling jacket which extends over at least part of the stator;
    a hollow helix having a predefined pitch and accommodated in the cooling jacket, said helix having a coolant inlet and a coolant outlet; and
    a baffle placed in proximity of the coolant outlet for deflecting coolant exiting the helix to flow into an interspace between turns of the helix in opposite direction to a coolant flow in the helix for discharge through an outlet of the cooling jacket.

10. The electrical machine of claim 9, wherein the inlet of the helix and the outlet of the cooling jacket extend in a common axial plane.

11. The electrical machine of claim 9, wherein the stator has a winding head which is thermally coupled to the cooling jacket.

* * * * *